United States Patent
Orbach et al.

(10) Patent No.: US 9,935,905 B2
(45) Date of Patent: Apr. 3, 2018

(54) SYSTEM FOR RESTRICTING THE DISTRIBUTION OF ATTACHMENTS TO ELECTRONIC MESSAGES

(71) Applicant: Protextion Technologies, LLC, Livingston, NJ (US)

(72) Inventors: David M. Orbach, Livingston, NJ (US); Evan John Kaye, Short Hills, NJ (US)

(73) Assignee: PROTEXTION TECHNOLOGIES, LLC, Livingston, NJ (US)

( * ) Notice: Subject to any disclaimer, the term of this patent is extended or adjusted under 35 U.S.C. 154(b) by 0 days.

(21) Appl. No.: 15/018,528

(22) Filed: Feb. 8, 2016

(65) Prior Publication Data

US 2016/0226801 A1 Aug. 4, 2016

Related U.S. Application Data

(63) Continuation of application No. 14/448,393, filed on Jul. 31, 2014, now Pat. No. 9,256,760, which is a continuation of application No. 13/564,569, filed on Aug. 1, 2012, now Pat. No. 8,832,802, and a continuation-in-part of application No. PCT/US2011/000191, filed on Feb. 1, 2011.

(60) Provisional application No. 61/649,674, filed on May 21, 2012, provisional application No. 61/300,122, filed on Feb. 1, 2010.

(51) Int. Cl.
| | |
|---|---|
| *H04L 29/00* | (2006.01) |
| *H04L 12/58* | (2006.01) |
| *G06Q 10/10* | (2012.01) |
| *G06F 21/60* | (2013.01) |
| *H04W 12/08* | (2009.01) |
| *G06F 21/62* | (2013.01) |
| *H04L 29/06* | (2006.01) |

(52) U.S. Cl.
CPC ............ *H04L 51/08* (2013.01); *G06F 21/606* (2013.01); *G06F 21/6218* (2013.01); *G06Q 10/107* (2013.01); *H04L 51/12* (2013.01); *H04L 51/14* (2013.01); *H04W 12/08* (2013.01); *H04L 63/0245* (2013.01); *H04L 63/101* (2013.01)

(58) Field of Classification Search
CPC .................. H04L 63/123; H04L 25/03866
USPC ....................................................... 726/2–10
See application file for complete search history.

(56) References Cited

U.S. PATENT DOCUMENTS

| | | |
|---|---|---|
| 7,590,693 B1 | 9/2009 | Chan et al. |
| 7,706,263 B2 | 4/2010 | Zhou et al. |

(Continued)

OTHER PUBLICATIONS

International Search Report for International Application No. PCT/US11/00191, dated Apr. 1, 2011.

(Continued)

*Primary Examiner* — Ghazal Shehni (74) *Attorney, Agent, or Firm* — Pearl Cohen Zedek Latzer Baratz LLP (57) ABSTRACT

A method of restricting the distribution of an image attachment to an electronic message via an electronic communications network comprises receiving, via the electronic communications network, the electronic message at a server; removing the image attachment from the electronic message; fragmenting the image into at least two image parts; and creating a set of rendering instructions as to how the at least two the image parts should be reconstituted to represent the original image.

13 Claims, 11 Drawing Sheets

(56) References Cited

U.S. PATENT DOCUMENTS

| | | |
|---|---|---|
| 2005/0071632 A1* | 3/2005 | Pauker ................ H04L 63/0442 |
| | | 713/165 |
| 2005/0086527 A1 | 4/2005 | Jackson |
| 2005/0283609 A1* | 12/2005 | Langford ................ G06F 21/64 |
| | | 713/176 |
| 2006/0177005 A1 | 8/2006 | Shaffer |
| 2007/0088848 A1 | 4/2007 | Chen et al. |
| 2007/0168436 A1 | 7/2007 | Andam |
| 2007/0226367 A1 | 9/2007 | Cai |
| 2009/0031393 A1 | 1/2009 | Denner |
| 2009/0234922 A1 | 9/2009 | Appelman |

OTHER PUBLICATIONS

Office Action for U.S. Appl. No. 13/564,569, dated Oct. 23, 2013.
Office Action for U.S. Appl. No. 14/448,393, dated May 18, 2015.
Notice of Allowance for U.S. Appl. No. 14/448,393, dated Oct. 2, 2015.

* cited by examiner

SYSTEM FOR RESTRICTING THE DISTRIBUTION OF ATTACHMENTS TO ELECTRONIC MESSAGES

CROSS REFERENCE TO RELATED APPLICATIONS

This application is a continuation of U.S. patent application Ser. No. 14/448,393, filed Jul. 31, 2014, which is a continuation of U.S. patent application Ser. No. 13/564,569, filed Aug. 1, 2012, which claims the benefit of U.S. Provisional Patent Application No. 61/649,674, filed May 21, 2012, and is also a continuation-in-part of PCT International Patent Application No. PCT/US11/00191, filed Feb. 1, 2011, which claimed the benefit of U.S. Provisional Patent Application No. 61/300,122, filed Feb. 1, 2010.

FIELD OF THE INVENTION

The present invention relates to the field of electronic communication networks and, in particular, to a system and method for a sender of an electronic message on a network to control and limit the distribution of an attachment to that message by flagging the message attachment to be forwarding restricted.

BACKGROUND OF THE INVENTION

Text messaging, such as Short Messages Service (SMS), also known as "texting", refers to the exchange (i.e., transmission and receipt) of brief written or text messages between digital mobile phones over cellular or other wireless networks. Individual messages are referred to as "text messages" or "texts". Many service providers or carriers also offer multimedia messaging services, such as Multimedia Messaging Service (MMS), that allow for exchange of messages containing multimedia content, such as image, video and sound content. The most common application of the service is person-to-person messaging.

To send such a message, a user types the text into a mobile phone or other text-enabled device, attaches the desired multimedia content, enters one or more phone numbers for the recipients of the message, and sends the message. A SMS or MMS center receives and stores the SMS/MMS message, and then forwards the message to the recipient when the recipient is available.

One problem with such messaging services is that recipients of such messages may without limitation forward them to third parties. While a user may create a customized SMS message that he/she intends for only the intended recipient to receive, the recipient can forward the message to multiple third parties, who may in turn forward the message onto to other parties, and so on.

With the advance in technology that permits texting to include images, photos and videos, a very common practice has arisen called "sexting", which is slang for the act of sending sexually explicit or suggestive content within or as part of a text message. A genre of texting, sexting involves sending either text, images or video that is intended to be sexually arousing. Many surveys show that an alarming number of children and teens have electronically sent nude or semi-nude images of themselves, and this number is growing rapidly.

Although sexting often takes place consensually between two people, it can also occur against the wishes of a person who is the subject of the content. An increasing social danger with sexting is that material can be very easily and widely promulgated, and the originator has no control over it. There have been many instances which have been reported throughout the news media where the recipients of sexting have shared the content of the messages with others, with less intimate intentions, such as to impress their friends or embarrass the sender, thereby increasing the instances where the intended recipient is not the only one viewing the content. Celebrities have also been victims of such abuses of sexting.

Although many public service advertisements and notices have urged children, teens and the general public to be wary of sexting or of sending any text message that they would not want someone other that the recipient to see, it has proven difficult to prevent individuals from sending these types of text messages. Similarly, it has also proven difficult to prevent recipients from forwarding messages to others.

It is an object of the present invention to prevent the recipient of such text messages from forwarding the message to those who were not intended to see the message in the first place.

It is an object of the present invention to provide a means to prevent the recipient of such text messages from forwarding the message non-intended recipients, where such means are respected by the respective devices as well as by the network service providers or carriers.

SUMMARY OF THE INVENTION

The invention solves the above problems by providing systems and methods that control whether a recipient of an electronic message (e.g., a text message, a multimedia message, an e-mail message, etc.) is permitted to forward the message and/or its attachment to third parties. The invention provides a system and mechanism for a sender of a text message including an image to limit the downstream distribution of that text message through text message forwarding by associating a forwarding restriction flag with the message and/or its attachment.

In one embodiment of the invention, a sender of a message can flag the message as not being allowed to be forwarded by including some simple text, for example, "DNF", within the text portion of the message or DNF flag indication attached to the message. In general, a user may not be able to force the recipient's client device to respect the simple DNF text flag that is included in the message because of the number of different client devices present in a network system. Most times, one does not have control over all the operating systems and applications on such client devices, for example, all the cell phones that are on a cellular network. Also, once a message is in unencrypted form on a client device, then the user can use its own application to forward such a message.

In certain embodiments of the invention, the messaging network would respect the forwarding restriction flag, even if the forwarding restriction flag is not respected by the recipient's client device. For example, the network, or a connected service, could store a copy of every message that it receives with a forwarding restricted flag and then compare each message sent from one of the recipients of such a message with all the forwarding restricted messages received by that device. If there is a match, and the message sent was not allowed to be forwarded (even with the flag removed), then the network will refuse to send such a message. Alternatively, the network, or a connected service, could store only copies of certain parts of a message that it receives with a DNF flag, e.g., the DNF attachment, and then compare that part or attachment of each message sent from one of the recipients of such a message with all the forwarding restricted attachments received by that device. If there is a match, and the message with the DNF attachment was not allowed to be forwarded (even with the flag removed), then the network will refuse to send such a message or attachment.

This core concept may involve several additional features:

1. Hashing: Whereas in one embodiment of the invention, the messaging network would store a copy of every forwarding-restricted message/attachment that it receives, many consumers may not like the idea of all their messages or message attachments, particularly those that are forwarding-restricted, being stored by the carrier. Accordingly, in one embodiment, all such stored forwarding restricted messages or attachments are compressed or "hashed", i.e., passed through a mathematical (cryptographic) hash algorithm or function, prior to being stored. Hash functions are often used to speed up data comparison tasks, such as detecting duplicated or similar records in a large file, by compressing large data sets of variable length to smaller data sets of a fixed length. In this situation, compressing the forwarding-restricted message or attachment through a hash algorithm converts it into a hash value, which is a semi-unique code. This hash value is nearly impossible to be converted back into the message but allows the forwarding-restricted message or attachment to be matched with the identical message or attachment that a recipient attempts to forward, because that message or attachment, when hashed, would be converted to the identical hash value. In this way, if a message or attachment sent by a subscriber is identical to one that was previously received by that person and has been designated as forwarding-restricted, then the carrier could detect this new message or attachment and block it from being sent. Algorithms that allow for some change to the image while still retaining the same value can also be used.

2. Flagging: In another embodiment of the invention, not all messages or attachments would be blocked, but rather only those that are flagged in some way. In this embodiment, only those messages or attachments with a designation such as "DNF" (do not forward) in them would be flagged and subject to the restrictions on forwarding. Of course, only those carriers implementing this standard would respect those flags. Alternatively, perhaps instead of "DNF", only images are subject to the forwarding restrictions.

3. Data Pooling: In a further embodiment, the network can limit the viral forwarding of messages or their attachments by, for instance, placing restrictions on the forwarding of a message or its attachment, such as a message containing a photo or the photo itself, regardless of whether it was initially flagged for restricted forwarding, if there is an indication that the message or photo is "going viral", i.e., being forwarded a very high number of times within a very short amount of time. In this embodiment, it may also be acceptable for the network to re-examine the content of a message that has been forwarded more than once or twice, for example a pre-set number of times or a pre-set number of times within a pre-set time period. In this embodiment, a network could track, such as via hash values, the path of a message or attachment, and when it has been forwarded more than a critical number of times within the network within a pre-set time period, then either block further forwarding of the message/attachment or re-examine the content of the message/attachment, either manually or through a software program. The critical number of times that a message/attachment is forwarded within the a pre-set time period would be set sufficiently high to indicate a level of interest that may be considered prurient or less-than-honorable, so as to trigger a closer inspection of the message or attachment being forwarded. The system can also block forwarding of a message or attachment that has been received by a chosen critical limited number of subscribers in its network, regardless of whether the message/attachment has left the carrier's network and been returned to the carrier's network by a subscriber of another carrier.

4. Notification: In yet another embodiment of the invention, the carrier could append to incoming messages that are intended not to be forwarded a designation, such as "DNF", that is sufficiently noticeable to the recipient so as to provide notification that the message/attachment being received is forwarding-restricted. The recipient of the forwarding-restricted message would then be less inclined to attempt to forward the message, thus potentially saving the computing resources of the network servers.

5. Keyword Screening: In still another embodiment of the invention, the carrier could screen for "adult" keywords that accompany an image, which keywords might suggest the image content. Further, the carrier could screen for "adult" keywords in replies to the sender of the image, which keywords might shed light on the image contents. If any of the critical, preselected "adult" keywords are used in either the original message or a reply thereto, the carrier may automatically flag the original message forwarding restricted.

6. User Specified Limits: In yet a further embodiment, a user may include parameters with the flag, such as to permit a message/attachment to be forwarded but only a limited number of times, such as up to three times. In this embodiment, the user could add a flag "DNF>3", which would indicate to the system not to forward the message or attachment more than 3 times. Then, if recipients attempt to forward the message or attachment more than the chosen limited number of times, further forwarding of the message/attachment would be prevented. A network could track, such as via hash values, the path of a message/attachment, and, when it has been forwarded the chosen limited critical number of times within the network, then further forwarding of the message is blocked. The system can also block a forwarding of a message that has been received by a chosen limited number of subscribers in its network, regardless of whether the message has left the carrier and been returned by a subscriber of another carrier.

7. DNF Non-Compliance Notification: In another embodiment, if a user flags a message or message attachment as forwarding restricted, then a first carrier can detect the second carrier to which the message/attachment is about to be delivered and ask the sender for verification that the message/attachment may be sent to that receiving carrier. For example, if the forwarding restricted message/attachment is being sent to a carrier that is not known to respect forwarding restriction flags, then the sending carrier may send an auto-reply to the sender as follows: "Your Do-Not-Forward request will not be enforced by 111-111-1111's network. Should the message/attachment still be sent? (reply with "yes", or do nothing)".

In a preferred embodiment, a central repository or sever would maintain all the stored forwarding-restricted messages/attachments or hash codes of those stored messages/attachments. In that way, all the carriers can share the restricted forwarding flags and thereby respect the rules set by the subscribers on any network. For instance, if a user indicates a limit of "DNF>10" on his message, then regardless of the carriers through which the forwarding-restricted message is forwarded, the central repository can track every time that the message is forwarded, keep a running tally of the number of times that the message is forwarded and advise users who try to forward the message once the forwarding limit has been reached that it can no longer be forwarded. In this embodiment, the cell phone carriers linked to the central repository would have to report forwarding on a real time basis and seek permission to forward further.

Another aspect of the invention is to decrease incentive for the user to send incriminating photos of themselves, particularly in the case of minors, by automatically sending to the account holder a copy of all text messages sent or forwarded from a phone on a particular account. The user could know in advance that the cell phone account has this setting, thereby providing a disincentive to send potentially incriminating photos of himself or others. In a variation on this, the account statement could contain thumbnail images of all images in messages that were forwarded by the phone.

In certain instances, a recipient of a forwarding-restricted message containing an image may attempt to defeat the forwarding restriction by copying the image into a new message. Forwarding of an attached photo can be limited through the addition of meta data associated with the image. For example, if a "DNF" flag is associated with the original message in which the photo was sent, the carrier could attach a DNF flag within the meta data of the image as well. In this way, the recipient would have difficulty modifying such meta data on the client device and the carrier, and other carriers could still respect the metadata flag when it reenters the network during a forwarding operation. A disadvantage is that if someone were to remove the flag, then it could be freely forwarded, and this might be more easily achieved than modification of the image itself, especially when substantial modification of the image may be necessary to change the hash value.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
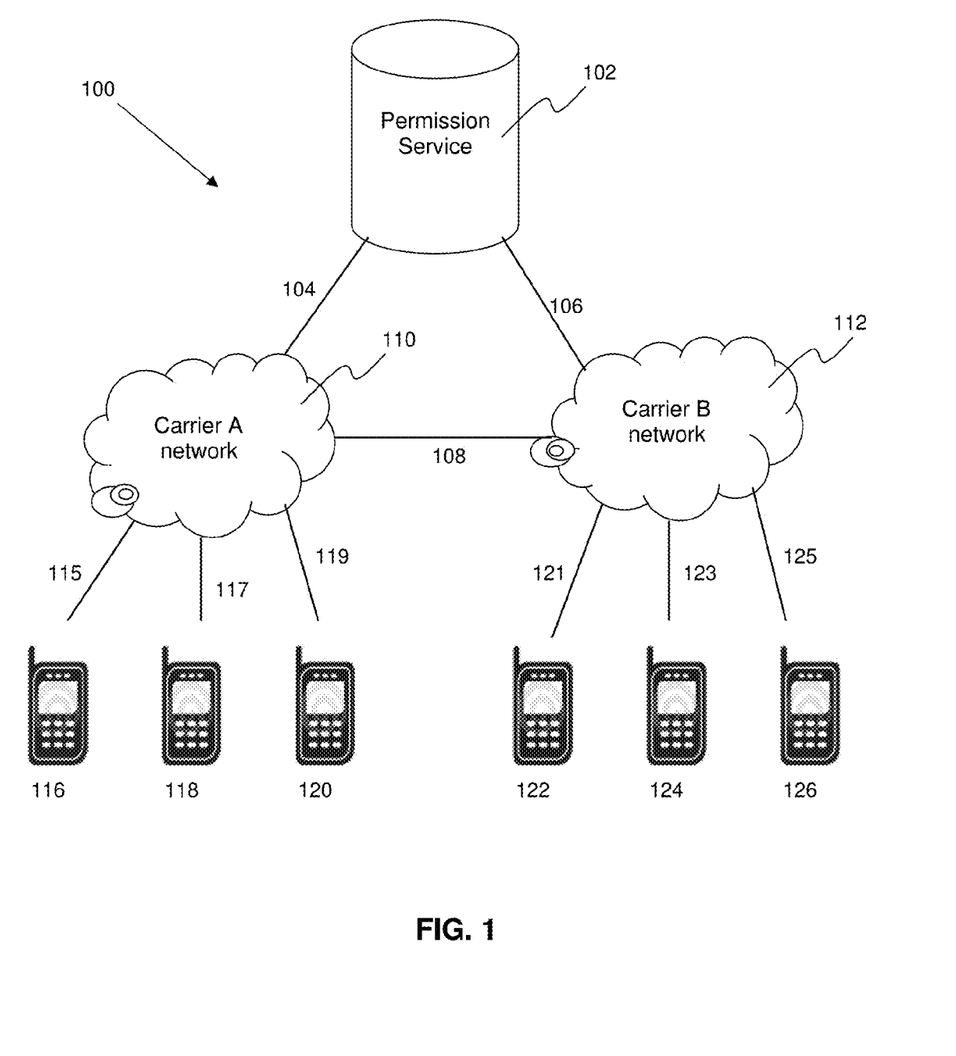
FIG. 1 illustrates an exemplary network arrangement of hardware for implementing a method in accordance with an embodiment of the invention.

FIG. 1 shows an example of a network arrangement of a hardware system 100 for use with the current invention. System 100 can be any known system configuration, such as a standard SMS or MMS system configuration, to provide various rich content services via interactions between a plurality of mobile users and a mobile network provider. System 100 includes various network types, such as 2G mobile networks, 3G mobile networks, internets, etc. The network interface can be accommodated via cellular systems, internet protocols as well as other related network message protocols. In addition, the multimedia messages transfer protocols on the 2G/3G mobile network can be compatible with the existing multimedia message transfer protocols on the internet.

System 100 has a first network 110 operated by Carrier A connected to a second network 112 operated by Carrier B through conventional carrier-carrier communications network link 108. Permission Service 102 operates independently from all network carriers and communicates with Carrier A and Carrier B independently. Permission Service 102 may be external to and accessible to all network carriers, or each network carrier may utilize its own separate Permission Service 102. Carrier A has a plurality of handsets subscribing to its network 110: a first handset 116 communicates with Carrier A 110 through link 115, as do a second handset 118 and a third handset 120 through their respective links 117 and 119. Carrier B also has a plurality of handsets subscribing to its network 112: a first handset 122 communicates with Carrier B 112 through link 121, as do a second handset 124 and third handset 126 through their respective links 123 and 125.

If a user takes a photo with handset 116 and wishes to send that photo in a text (SMS or MMS) message to the user of handset, that communication will typically travel over a conventional communication link. For example, if the intended recipient is the user of handset 118, then the communication will typically travel over the internal communication network 110 of Carrier A. However, if the intended recipient is the user of handset 128, then that communication will typically travel over the conventional carrier-carrier communication link 108 from network 110 of Carrier to network 112 of Carrier B. In embodiments of this invention, as will be discussed below, Carrier A 110 first checks with the Permission Service 102 whether it is permitted to send the first message on to the second handset before sending the message.

Figure 2:
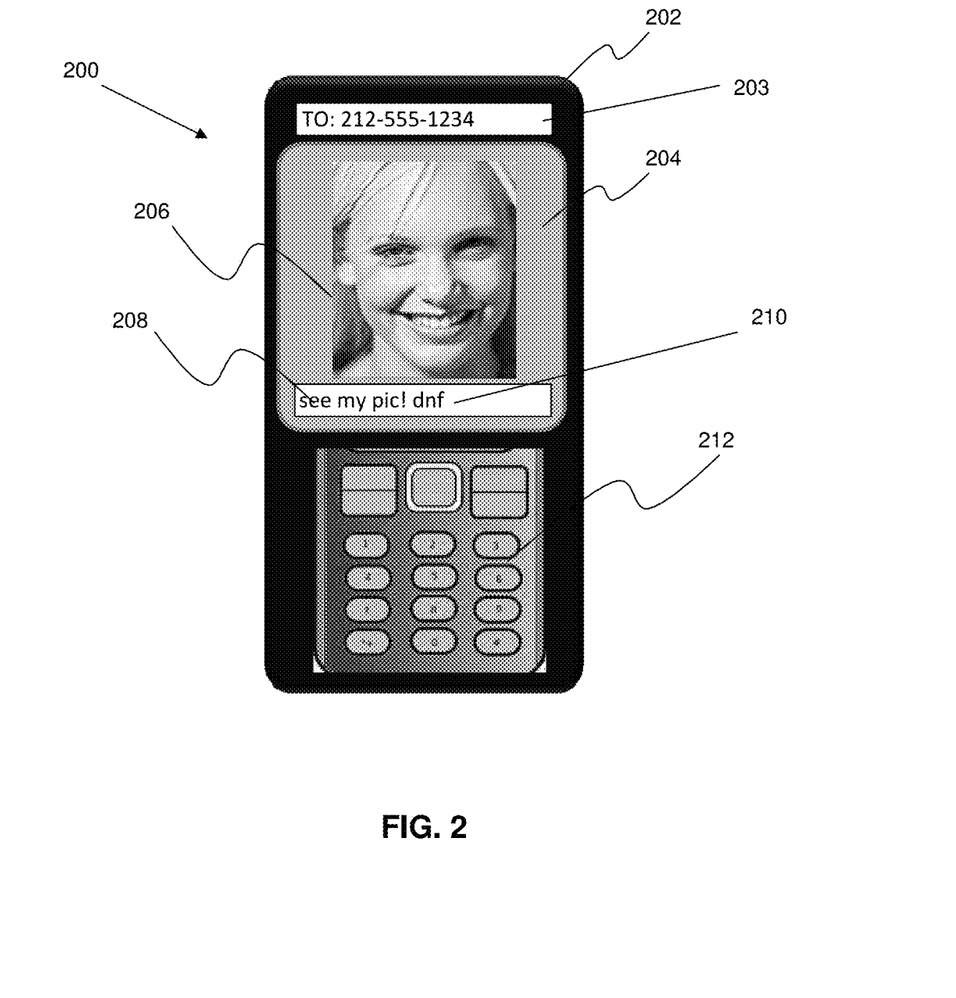
FIG. 2 shows a sender's handset in preparation for sending a text message with image or photo attached.

With reference now to FIG. 2, a handset 200 is depicted, such as handset 116 of FIG. 1, with its outer casing 202, screen 204 and keypad 212. On the screen 204, various components of a SMS/MMS text message authoring session are displayed, such as the recipient's phone number 203, the photo 206 that was taken by that handset and is now about to be included with the message, and the text component 208 of the text message which also contains the "DNF" text flag 210 indicating that this message is for the recipient only and should not be forwarded.

It is preferred that the designation, such as "DNF", be sufficiently noticeable to the recipient so as to provide notification that the message being received is forwarding-restricted. The recipient of the forwarding-restricted message would then be less inclined to attempt to forward the message, thus potentially saving the computing resources of the network servers.

Figure 3A:
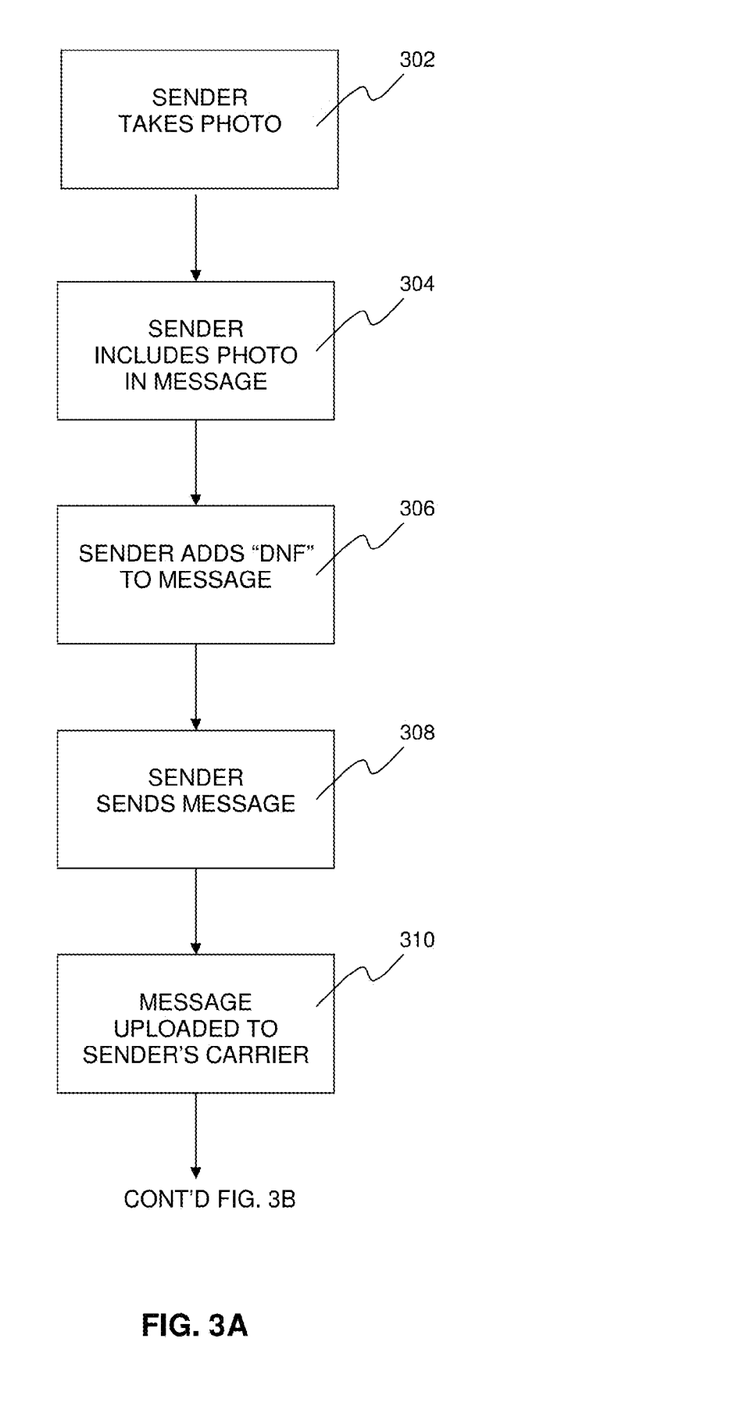
FIGS. 3A-3C shows a process flow diagram of a text message with an image being sent from a sender subscribed to a first carrier to a recipient subscribed to a second carrier.

FIG. 3A shows a process flow diagram 300 of the sending of text message 208 and photo 206 of FIG. 2 (or other attachment) from handset 200 of a sender subscribed to the network of carrier A to a recipient. At step 302, the sender captures photo 206 with handset 200, at step 304 the sender includes photo 206 in a text message 208, and at step 306 the sender adds the forwarding restriction "DNF" 210 to the body of text in the message. At step 308, the sender sends the message, which prompts handset 200 to upload the text and photo in the message to the network of the sender's carrier, e.g., network 110 of carrier A, at step 310.

In one embodiment of the invention, carrier A would send a copy of the photo or other attachment included within the forwarding-restricted message that it receives from handset 200 (or the entire forwarding-restricted message itself) and send it to Permission Service 102 for inclusion in the Do-Not-Forward database of forwarding-restricted messages. When that recipient or a subsequent recipient attempts to forward a message that includes a photo or other attachment, the photo/attachment in that message is compared with the photos/attachments stored in the DNF database at Permission Service 102. If a message or photo/attachment to be sent by a subscriber is identical to one that was is stored at Permission Service 102 and designated as forwarding-restricted, then the carrier would block this photo/attachment from being sent.

In another embodiment, in order to avoid Permission Service 102 having to store all forwarding-restricted photos, attachments or messages, all such stored forwarding restricted messages (or the forwarding-restricted photos/attachments forwarded within those messages are compressed or "hashed", i.e., passed through a mathematical algorithm known as a hash function, prior to being stored and converted into code. Compressing the forwarding-restricted message or attachment through a hash algorithm converts it into a hash value, which is a semi-unique code. Alternatively, other mathematical encryption algorithms that convert blocks of data, such as photos, attachments or messages, into resulting fixed-size data units may be used, preferably where such resulting data units cannot be converted back (i.e., "un-compressed") into the original data blocks.

This code is then stored by Permission Service 102. Then, when another user attempts to forward a photo or other attachment, the photo or attachment to be forwarded is hashed and then compared to the hash codes stored at Permission Service 102. If the hash code of the photo or attachment to be forwarded identically matches a hash code of stored at Permission Service 102 and designated as being forwarding-restricted, then the carrier would block this photo from being sent. Along with the hash data associated with the forwarding-restricted attachments or messages that are received by an individual, Permission Service 102 could also store some identifying information for that individual, such as phone number, account or other identification number, etc., so as to be able to later compare attachments or messages that the individual attempts to forward with those that the individual has received. Alternatively, if no such identifying information is stored with the hash values, the then DNF attachments or messages will be globally restricted.

It is noted that data storage by Permission Service 102 of hash values of the forwarding-restricted attachments or messages is considered to be secure and carries no risk of recovery of the forwarding-restricted attachments or messages. This is because it is nearly impossible to convert the stored hash values back into the original attachments or messages that were processed with the hash function and resulted in the stored hash values, such that the original, forwarding-restricted attachments cannot be recovered from the data storage.

Figure 3B:
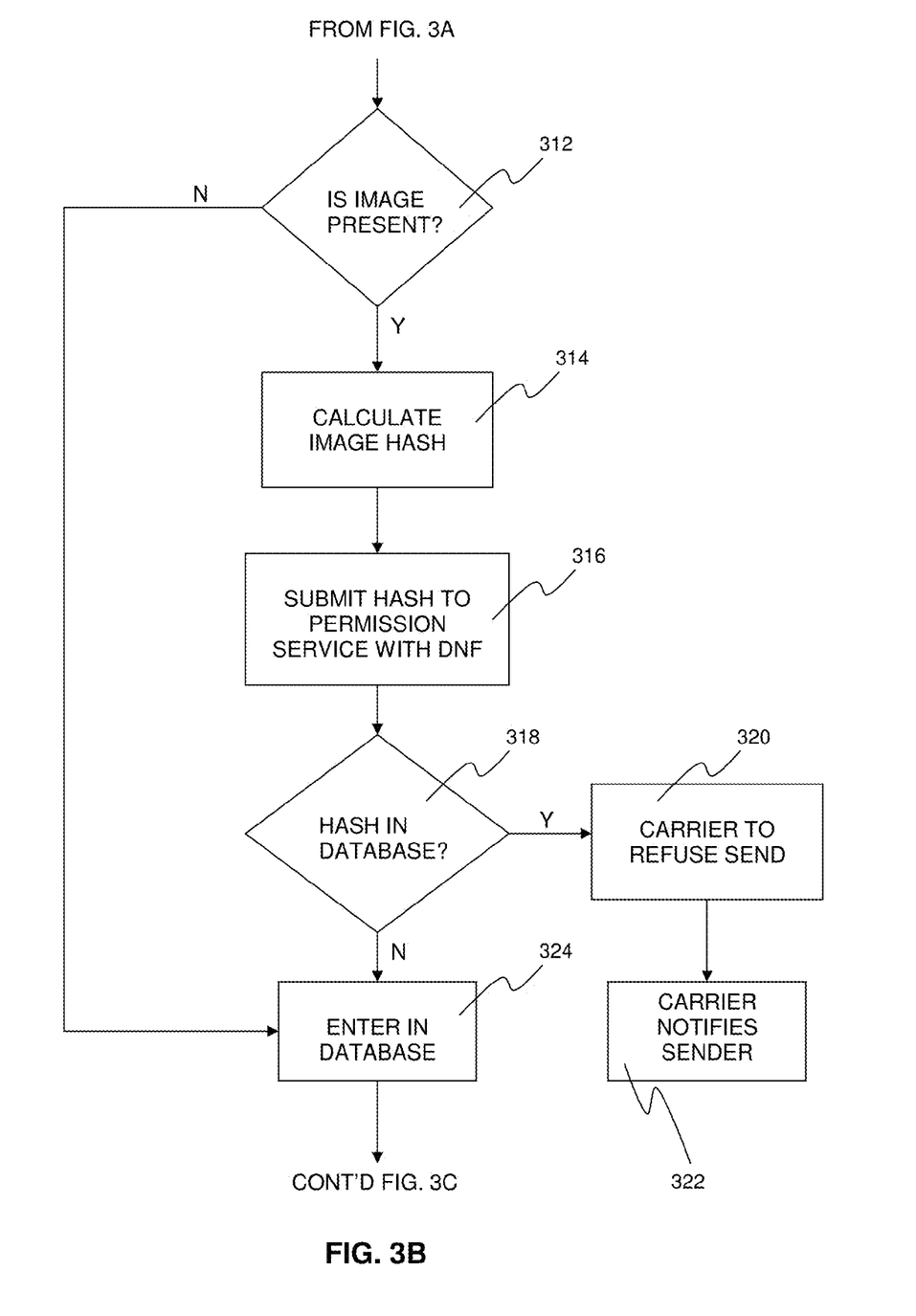

Continuing the process flow on FIG. 3B, at step 312 the carrier evaluates whether an image 206 was received from handset 200 within text message 208. If no image 206 was present, then the carrier need not check with the Permission Service 102, and the carrier proceeds to send the text message 208 as normal (see step 326 of FIG. 3C).

If an image 206 is present in text message 208, at step 314 of FIG. 3B the carrier calculates the hash value of the image 206. The hash value can be calculated by a number of different algorithms, as known by those with skill in the art. In this regard, it is preferable that the same hash algorithm be used by all the carriers so that the results of all hash values will be consistent can be compared.

Figure 4:
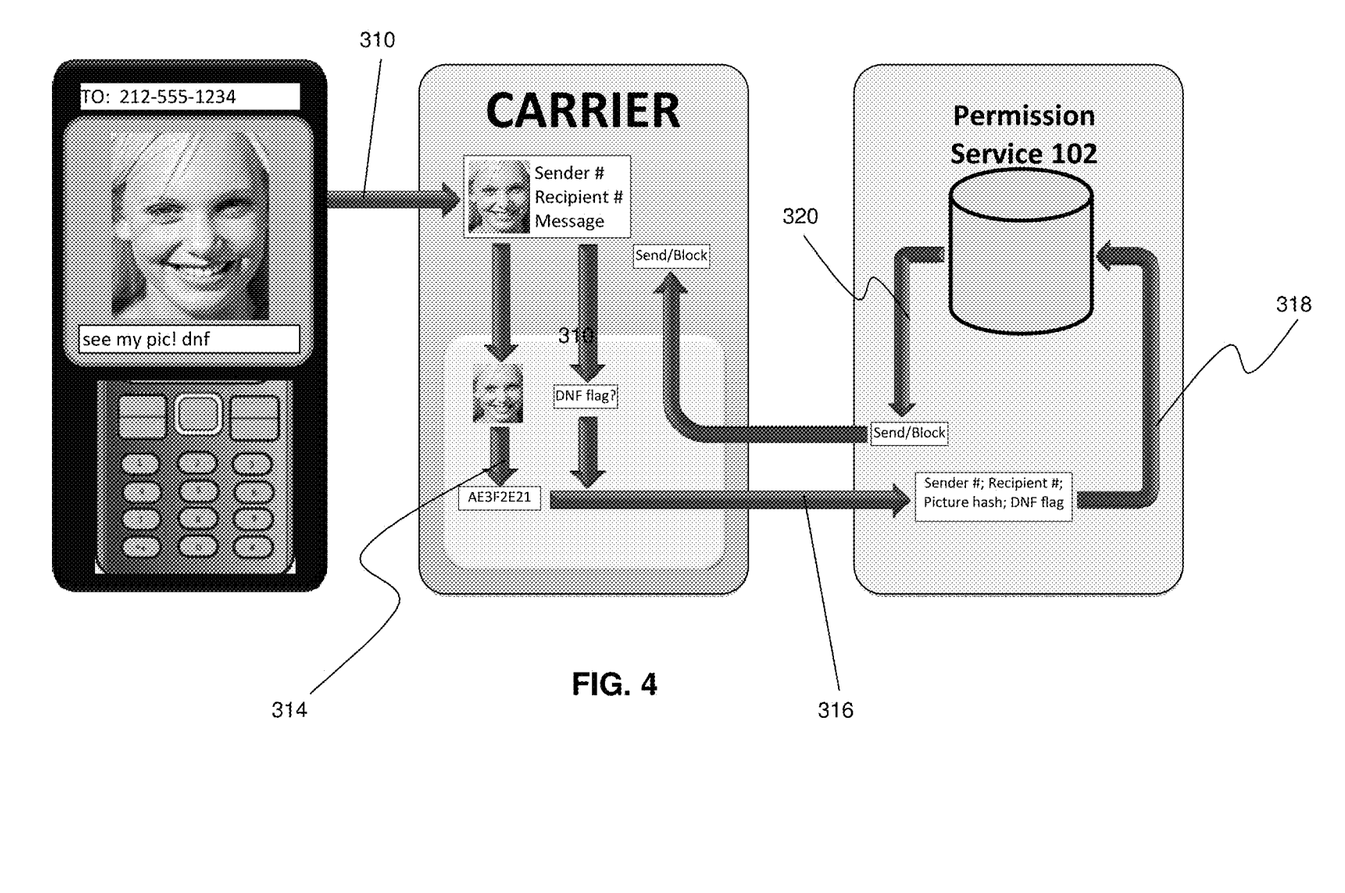
FIG. 4 shows a graphical flow diagram of the DNF verification process taken when a text message with an image is sent from a sender to a carrier.

At step 316, the hash value along with the "DNF" request is sent to the Permission Service. At step 318, the Permission Service 102 checks its Do-Not-Forward database to determine whether the image was previously been sent and designated as forwarding-restricted. In one embodiment, Permission Service 102 checks its Do-Not-Forward database for data associated with that sender to determine whether the image was previously received by that sender as forwarding-restricted. If the exact same hash value, or a hash value with a difference from the comparison hash value below a certain threshold, is present in Permission Service DNF database, then the image must previously have been sent (to that sender) and designated as forwarding-restricted, and the sender is attempting to forward this forwarding-restricted image. The Permission Service then sends the carrier a refusal message at step 320, and the carrier in turn then refuses to send the message and so notifies the sender at step 322. This is also shown graphically in FIG. 4.

However, if the exact same hash value is not present in the Permission Service's Do-Not-Forward database, then at step 324 the Permission Service enters this hash value into the Do-Not-Forward database of forwarding-restricted messages. In one embodiment, the identical hash value would have to be absent from the Permission Service's Do-Not-Forward database associated with that individual in order for the Permission Service to enter this hash value into the Do-Not-Forward database of forwarding-restricted messages that are associated it with that individual. This image or photo is saved into the DNF database at Permission Service 102 because the "DNF" flagged photo was sent to the Permission Service to determine whether the message could be forwarded. Naturally, if there had not been a "DNF" flag associated with the photo, then the photo would not be stored in the DNF database at Permission Service 102.

Figure 3C:
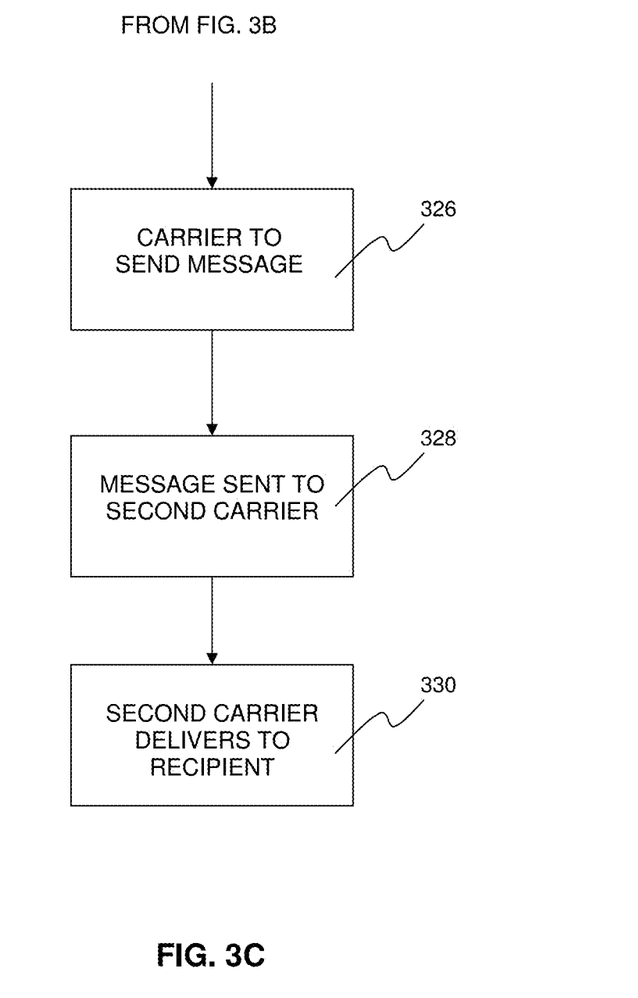

The process flow continues in FIG. 3C where at step 326 the carrier proceeds to send the message. At step 328, the message is passed to the second carrier, if the recipient is a subscriber to the network of a carrier other than the network of the sender's carrier, and at step 330 the second carrier delivers the message to the recipient.

The invention can apply to any message attachments, such as photos (which are discussed herein as an exemplary attachment), as in the above process flow, or to simple text messages, where a hash value can be calculated from the text message itself and not an associated image.

In a further embodiment, the sender may include parameters with the DNF flag, such as to permit a message to be forwarded only a limited number of times. In this embodiment, the user could add a flag "DNF>3", which would indicate to the system not to forward the message more than three times. In this regard, the Permission Service stores a counter along with each stored DNF photo to internally tally the amount of times that forwarding-restricted photo has been forwarded. If the inquiry to the Permission Service for forwarding the photo has not reached the maximum permitted number of forwards, then the Permission Service does not issue a "block", and each permitted forward of the forwarding-restricted photo increases the tally by one. If a recipient attempts to forward the message but the Permission Service has determined that the maximum permitted number of forwards has been reached, further forwarding of the message is prevented. Alternatively, the network could also track, such as via hash values, the path of a message, and, when it has been forwarded the chosen limited critical number of times within the network.

In still another embodiment, the user's carrier can detect the carrier to which the message flagged as being forwarding restricted is about to be delivered and ask the sender for verification that the message may be sent to the receiving carrier. For example, if the forwarding restricted message is being sent to a carrier that is not known to respect forwarding restriction flags, then the sending carrier may send an auto-reply to the sender as follows: "Your Do-Not-Forward request will not be enforced by 111-111-1111's network. Should the message still be sent? (reply with "yes", or do nothing)".

Figure 5A:
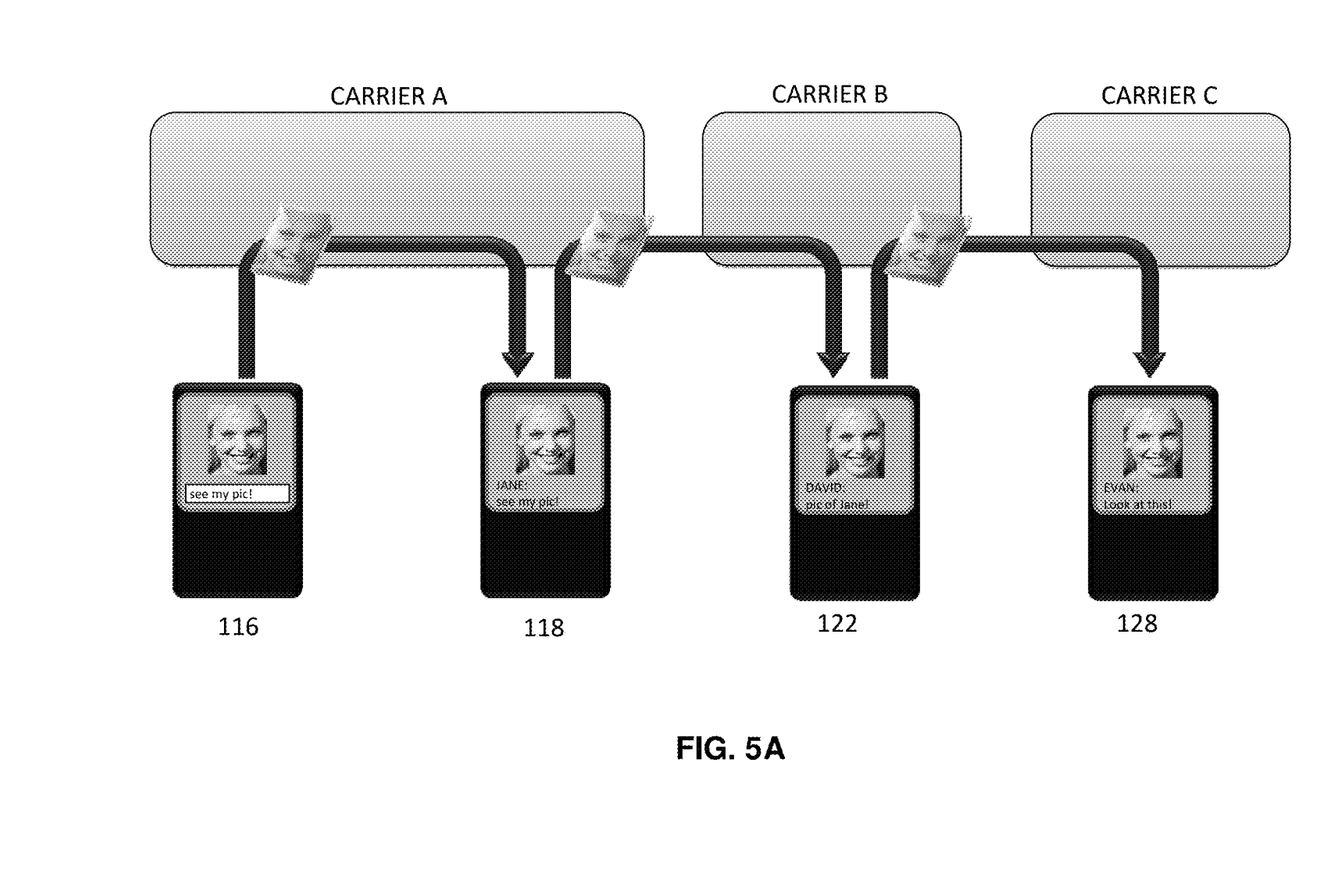
FIG. 5A shows a sequence of forwarding that would occur in the absence of the system of the invention.

FIG. 5A shows a sequence of forwarding that would occur in the absence of the system of the invention. In this sequence, user of handset 116 forwards the text message with photo to the user of handset 118 within the network of Carrier A. User of handset 118 forwards the text message with photo to the user of handset 122, who is a subscriber to the network of Carrier B, who forwards the text message with photo to the user of handset 128, who is a subscriber to the network of Carrier C. In this sequence, with no forwarding restrictions, the text message with photo can be forwarded to anyone anywhere.

Figure 5B:
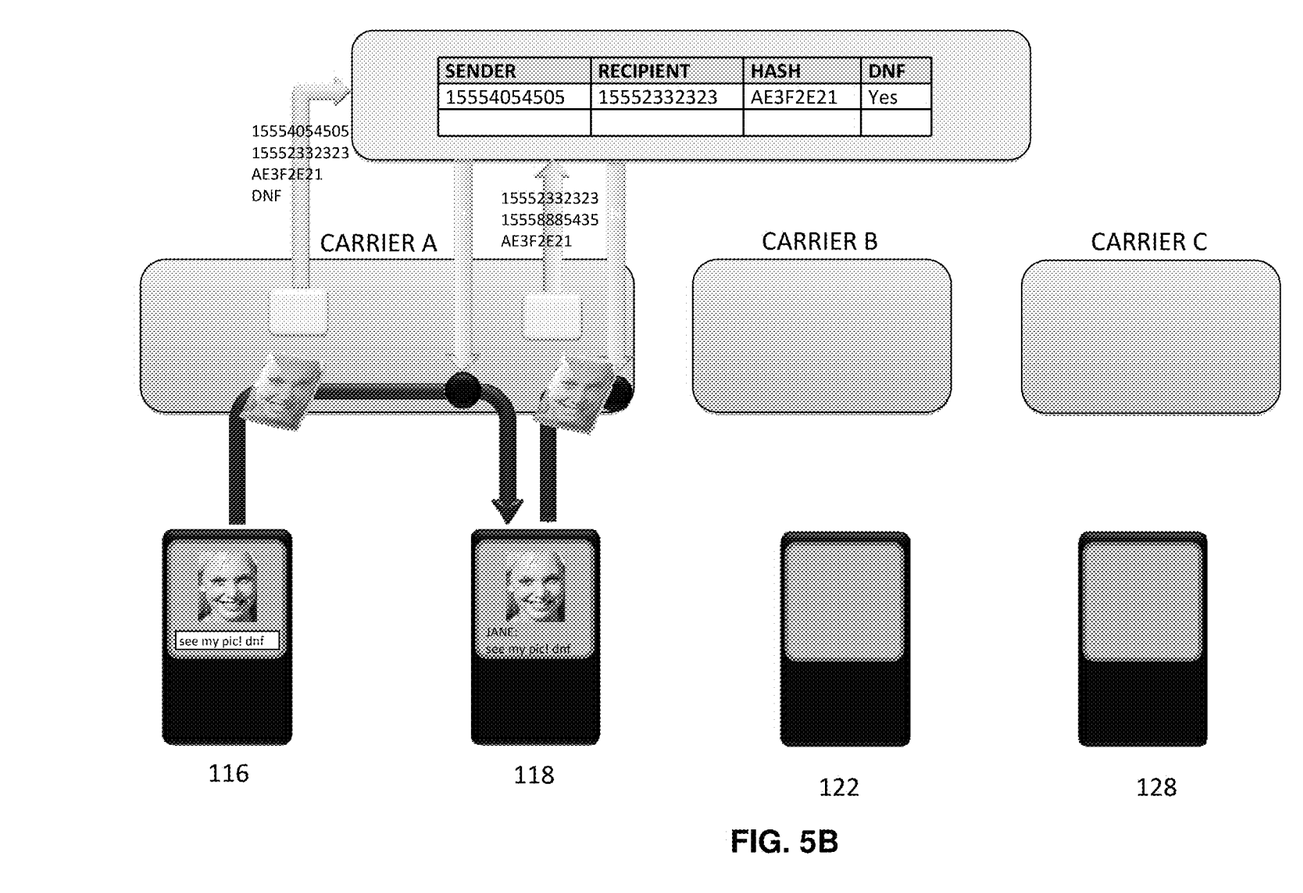
FIG. 5B shows a sequence of forwarding that occurs in the presence of the system of the invention.

In FIG. 5B, however, once the text message with photo that is marked with the DNF flag and that has been designated as forwarding-restricted has been forwarded from user of handset 116 to the user of handset 118 within the network of Carrier A, the photo is stored within the DNF database at Permission Service 102. The system of the invention then prevents the user of handset 118 from forwarding the text message with DNF photo to the user of handset 122, who is a subscriber to the network of Carrier B. Thus, neither the user of handset 122 nor the user of handset 128, nor anyone else, can receive the text message with the DNF photo.

It should be noted, however, that, under the current state of technology, once an MMS message is received on a device, e.g., handset 116, it may be quite simple to save that image to the device's photo storage. If this happens, the DNF restrictions for an MMS-attached image may be circumvented by the user of that device merely by forwarding that saved image via text/MMS or e-mail communication rather than by forwarding the original text message communication. Any check by network servers to see if the image matches a hash value of any message on a DNF list would be thereby bypassed.

Figure 6:
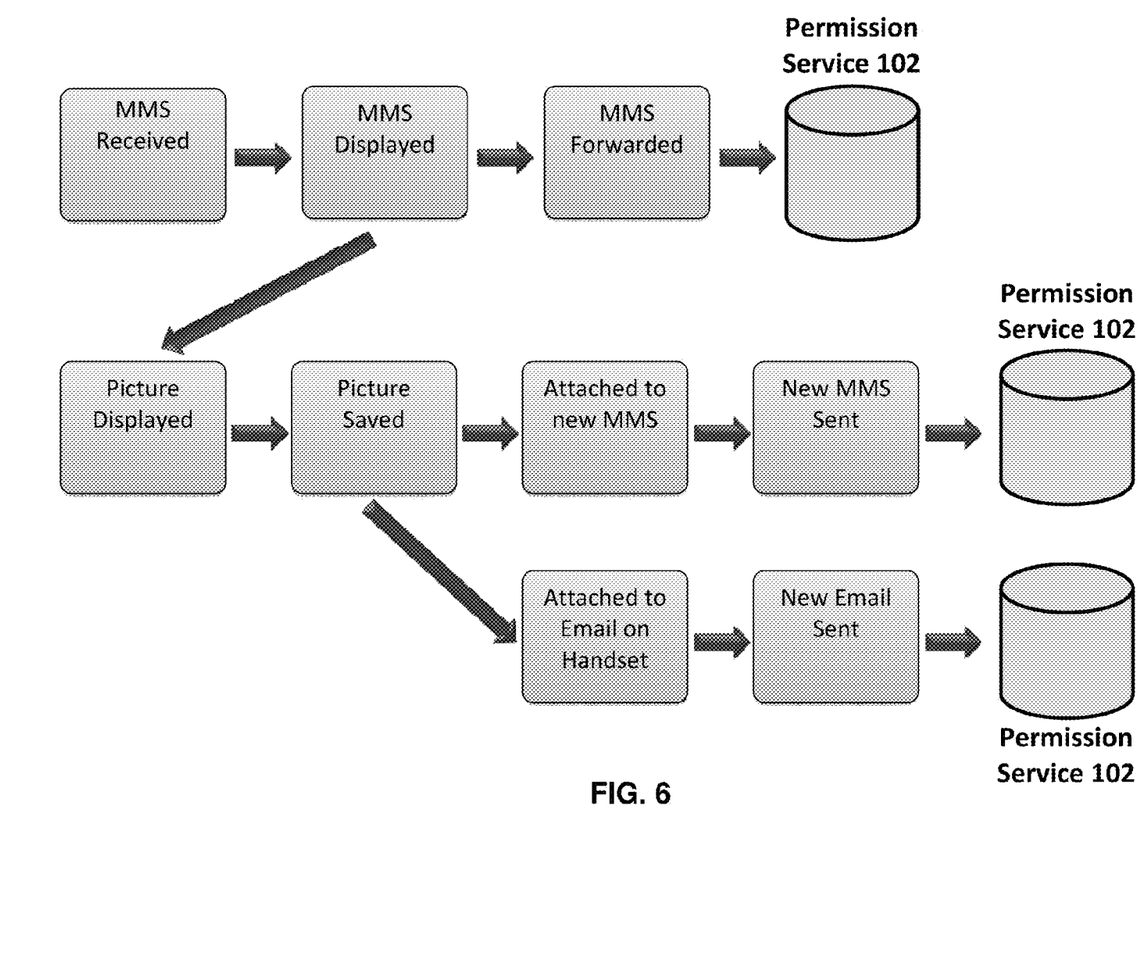
FIG. 6 shows a process flow diagram for ensuring that all outgoing message attachments are subjected to a check with the Permission Service.

A further aspect of the invention, as shown in the second and third lines of FIG. 6, is to provide a mechanism whereby all outgoing image text/MMS or e-mail attachments from a client device are subjected to the same check with the Permission Service 102 as the forwarded text messages, as described above. However, in order that not every text or e-mail attachment need be checked, a carrier may screen for text or e-mail attachments that have characteristics of images, often most easily identified through MIME types, for example, as well as others known in the art.

It is common practice for users of mobile phones to sometimes use web-based e-mail services, rather than the e-mail functionality provided by the carrier or handset. Images that are attached to e-mails through web-based e-mail systems are uploaded to a website during the transmission process. Accordingly, this should be considered in the network traffic being screened for images originating from the handset, such that all internet traffic from the handset should be screened for data that has characteristics of an image file, not just data that passes through the carrier's e-mail service, as shown in FIG. 6.

It should also be noted that an image that is saved to a client device can often be accessed when that client device is connected or synchronized with a personal computer. When this happens, the DNF restrictions for an MMS-attached image may be circumvented by transferring of the image off the client device without the image first having been subjected to any checks, e.g., by Permission Service 102, to see if that image matches an image on a DNF list. Then, once on a personal computer, the image can be disseminated through social network sites or attached to emails without DNF restrictions. Accordingly, unless the internet traffic is screened for images and subjected to the DNF screening process by an Internet Service Provider, or other entity that is in the pathway of the internet traffic from the personal computer, then an unprotected pathway exists for an image with DNF restrictions to still be disseminated.

One mechanism to substantially impair the dissemination of forwarding restricted content is through image fragmentation. When an MMS message is viewed on a client device, it is typically displayed by the device's image viewer. This image viewer's application built into the device, or as part of the device's operating system, typically provides the functionality for that image to be saved to the device's photo album. It is possible to prevent an MMS image attachment from being displayed by the device's image viewer application and thereby make it more difficult for the user to save the image to the device's photo album for the purpose of disseminating it through aforementioned mechanisms, or to even forward it directly from the image viewer application, as is possible with some image viewer applications.

Figure 7:
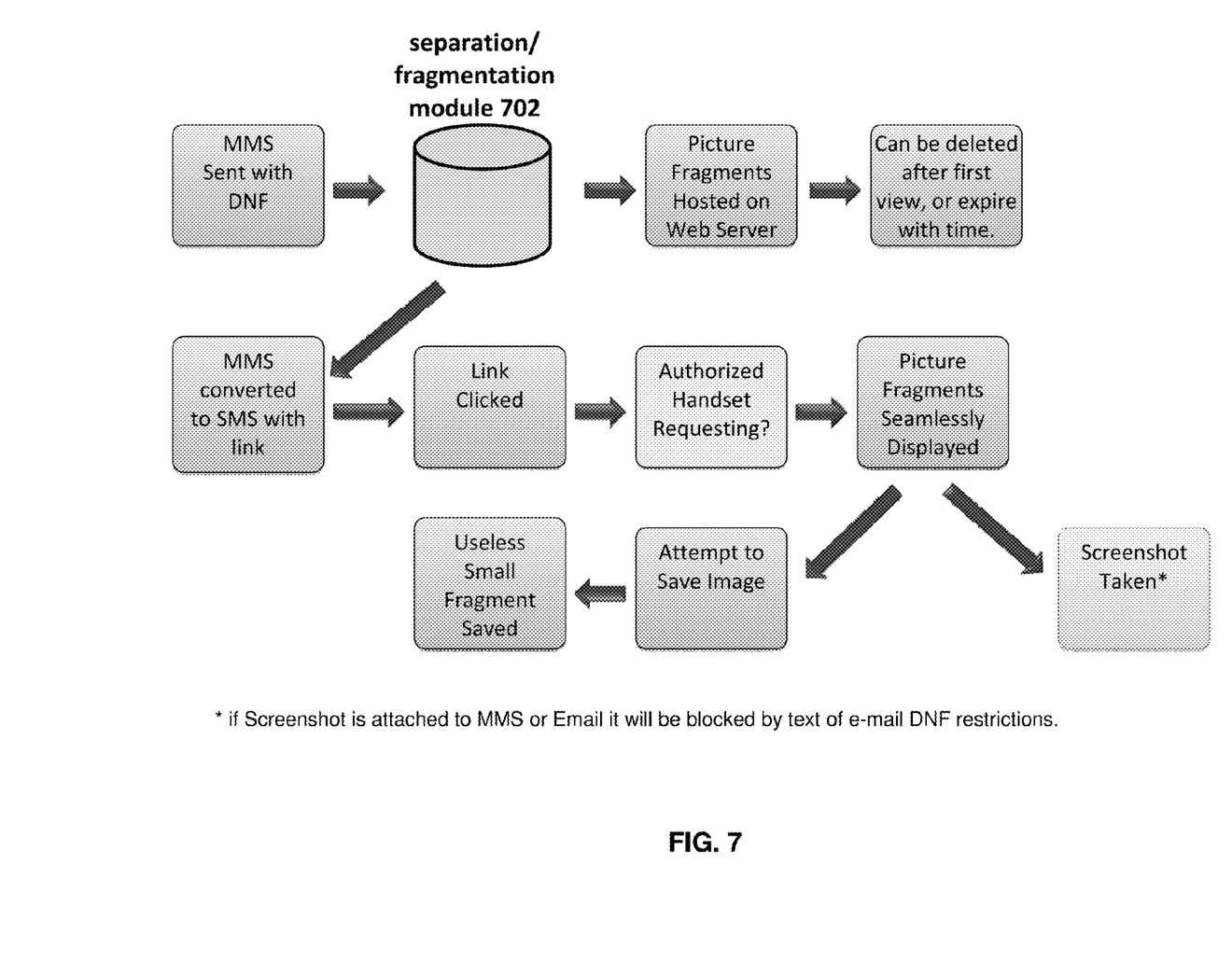
FIG. 7 shows a process flow diagram for impairing the dissemination of forwarding restricted content through image fragmentation.

As shown in FIG. 7, one mechanism to prevent the image from being displayed in the image view application is for the network, for example a dedicated separation/fragmentation module, to detach the image from an MMS message, convert the text portion of the image into a simple text message without an image attachment, and then fragment the image into multiple fragments or pieces, e.g., in a geometric shape, such as the shape of squares or rectangles, and post the image fragments to a web server. An HTML page would be constructed with references to the image fragment URL's on the web server and, when viewed in a web browser, would contain HTML markup that allows the web browser to seamlessly display all the rectangles together. The URL of the HTML file would then be appended to the text of the text message. Any URL links that are sent in a text message are typically recognized by a client device as a URL, and the text message application provides a mechanism for the user to navigate to the URL in a web browser by a simple selection (e.g., click, or touch on a screen, depending on the capabilities of the client device). In this way, the HTML file and referenced image fragments will be downloaded from the web server and displayed in a web browser on the device.

Many web browsers also provide a simple mechanism to save images on a web page to the device's photo album, but, given that the viewed photo now comprises many small image fragments, any attempt to save the image will result in just a small fragment being saved to the client device, rather than the entire image. The image fragmentation mechanism provides yet another barrier to preventing a user from easily forwarding a restricted message. Carriers are able to detect which device in their network requested a web page from a web server in their network and can therefore only allow a request for an HTML page, or image files, originating from a specific handset to retrieve the content at that URL. This is important to prevent a user accessing the image fragments from a desktop device, or another handset that might have been forwarded the text message with appended URL.

Another mechanism to substantially impair the dissemination of forwarding restricted content is through Automated DNF Tagging. There are increasingly sophisticated algorithms available that use image processing techniques to discern if an image has a high probability of containing nudity. Such algorithms can be used in conjunction with the present invention. Once an image attached to an MMS message has been determined to have a high probability of containing nudity, that MMS message can be automatically tagged as a DNF message.

Figure 8:
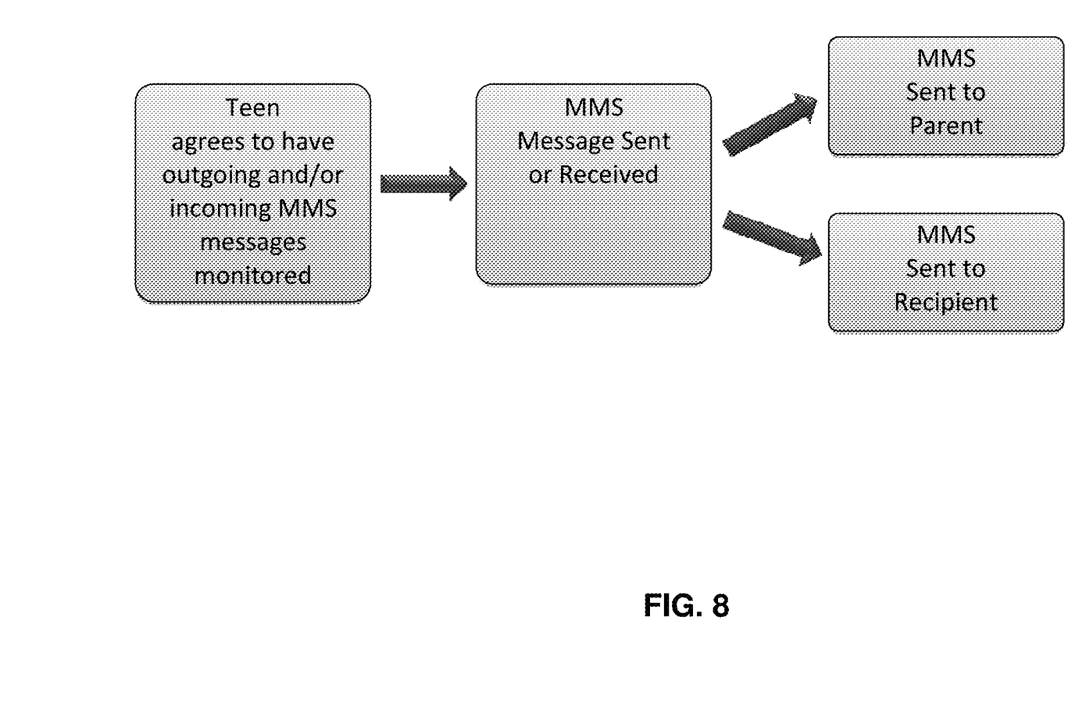
FIG. 8 shows a process flow diagram for impairing the dissemination of forwarding restricted content through automatic message copying.

A further mechanism to substantially impair the dissemination of forwarding restricted content is through a mechanism, as shown in FIG. 8, wherein a parent or guardian automatically receives a copy of each text message or e-mail sent. As an alternative to receiving every message sent and/or received in real time, the parent or guardian can receive a daily summary of any activity by email, or receiving all the pictures as part of the electronic or printed monthly account summary.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of restricting the distribution of an image attachment to an electronic message sent by a sender to a recipient via an electronic communications network, the method comprising:
receiving, via the electronic communications network, the electronic message at a server from the sender;
removing, via the server, the image attachment from the electronic message;
fragmenting, via the server, the image attachment into at least two different image parts;
creating, via the server, a set of rendering instructions as to how the at least two different image parts should be displayed together to represent the image attachment;
posting, by the server, the at least two different image parts to a web server; and
forwarding the electronic message and the set of rendering instructions to the recipient, wherein the set of rendering instructions allows the recipient to reconstitute the image attachment by displaying the at least two different image parts together via the web server.

2. The method of claim 1, wherein said set of rendering instructions comprises at least one link to a URL for each image part, wherein access to the at least one link to the URL by a web browser of the recipient allows the recipient to reconstitute the image.

3. The method of claim 1, wherein the posting of the at least two different image parts to the web server expires after a predetermined amount of time or after the image has been reconstituted a predetermined number of times.

4. The method of claim 1, further comprising transmitting the electronic message, the set of rendering instructions and the at least two different image parts to an application on a client machine of the recipient.

5. The method of claim 1, wherein the electronic message is a text message, and the electronic communications network is a cellular network.

6. The method of claim 1, wherein the electronic message is an electronic mail message, and the electronic communications network is the Internet.

7. The method of claim 1, wherein the steps of removing, fragmenting and creating are performed only if distribution of the image attachment to the electronic message has been designated as being restricted.

8. A method of restricting the distribution of an image file attached to a text file sent by a sender to a recipient via a cellular network, the method comprising:
receiving, via the cellular network, the text file with at least one reference to the image file at a server from the sender;
fragmenting, via the server, the image file into at least two different image parts;
replacing, via the server, the at least one reference to the image file in the text file with at least two new references to the at least two different image parts;
posting, by the server, the at least two different image parts to a web server; and
forwarding the text file and the set of rendering instructions to the recipient, wherein the set of rendering instructions allows the recipient to reconstitute the image file by displaying the at least two different image parts together via the web server.

9. The method of claim 8, further comprising transmitting the text file with the at least two new references to the at least two different image parts to a client machine of the recipient.

10. The method of claim 9, wherein the recipient's client machine, using an application, renders the resultant text file and reconstitutes the image from the at least two different image parts.

11. The method of claim 10, wherein the application is a web browser that is used to render HTML markup, and the at least two different image parts are standard image files that are supported by a standard web browser.

12. The method of claim 8, wherein access to at least two new references to the at least two different image parts expires after a predetermined amount of time or after the image file has been reconstituted a predetermined number of times.

13. The method of claim 8, wherein the steps of fragmenting and replacing are performed only if distribution of the image file has been designated as being restricted.

\* \* \* \* \*